United States Patent
Karvinen (10) Patent No.: US 9,492,970 B2
(45) Date of Patent: Nov. 15, 2016

(54) METHOD FOR MANUFACTURING THE IMPELLER OF A CENTRIFUGAL COMPRESSOR

(75) Inventor: Juha Karvinen, Siltakylä (FI)

(73) Assignee: RUNTECH SYSTEMS OY, Kolho (FI)

(*) Notice: Subject to any disclaimer, the term of this patent is extended or adjusted under 35 U.S.C. 154(b) by 999 days.

(21) Appl. No.: 12/712,876

(22) Filed: Feb. 25, 2010

(65) Prior Publication Data
US 2011/0173812 A1 Jul. 21, 2011

(30) Foreign Application Priority Data
Jan. 21, 2010 (FI) ..................... 20105048

(51) Int. Cl.
| | | |
|---|---|---|
| B23P 15/04 | (2006.01) | |
| B29C 70/02 | (2006.01) | |
| B29C 70/48 | (2006.01) | |
| B29C 70/54 | (2006.01) | |
| F04D 29/02 | (2006.01) | |
| F04D 29/28 | (2006.01) | |
| B29C 33/44 | (2006.01) | |
| B29C 33/52 | (2006.01) | |

(52) U.S. Cl.
CPC ............ B29C 70/025 (2013.01); B29C 70/48 (2013.01); B29C 70/543 (2013.01); F04D 29/023 (2013.01); F04D 29/281 (2013.01); F04D 29/284 (2013.01); B29C 33/448 (2013.01); B29C 33/52 (2013.01); F05D 2260/95 (2013.01); F05D 2300/603 (2013.01); Y10T 29/49329 (2015.01)

(58) Field of Classification Search
CPC ..... B29C 70/025; B29C 33/00; B29C 45/17; Y10T 29/49329
USPC ...... 29/889.4, 419.1, 527.1, 557; 416/229 R, 416/230, 229 A; 264/103, 152, 257, 258, 264/317
See application file for complete search history.

(56) References Cited

U.S. PATENT DOCUMENTS

| | | | | |
|---|---|---|---|---|
| 3,059,282 A | * | 10/1962 | Smith ................ | B22C 7/02 164/35 |
| 3,632,460 A | * | 1/1972 | Palfreyman .......... | B29C 70/04 156/169 |
| 3,670,382 A | * | 6/1972 | Keehan ............... | B29C 70/04 29/889.4 |
| 3,743,440 A | * | 7/1973 | Moore ................ | B64C 1/34 416/132 B |
| 3,758,232 A | * | 9/1973 | Wallett .............. | F01D 5/282 416/213 R |

(Continued)

FOREIGN PATENT DOCUMENTS

| | | |
|---|---|---|
| DE | 10323132 A1 | 12/2004 |
| EP | 1 197 309 A1 | 4/2002 |

(Continued)

*Primary Examiner* — Peter DungBa Vo
*Assistant Examiner* — Kaying Kue
(74) *Attorney, Agent, or Firm* — Birch, Stewart, Kolasch & Birch, LLP (57) ABSTRACT

The invention relates to a method for manufacturing the impeller of a centrifugal, that is, a radial compressor or radial blower, said impeller being mounted directly on the shaft of an electric motor. An essential feature of the invention is that the composite material impeller is made using an RTM process, wherein the RTM mold has a core and accurately trimmed fabrics placed therein in such a manner that the fabric layers, or preforms, are pulled onto the core thus achieving a maximally optimized use of materials in the structure.

13 Claims, 6 Drawing Sheets

(56) References Cited

U.S. PATENT DOCUMENTS

| | | | | |
|---|---|---|---|---|
| 3,846,045 A * | 11/1974 | Mincuzzi | F04D 29/026 | 415/119 |
| 4,517,260 A * | 5/1985 | Mitsuda | H01M 8/0293 | 429/498 |
| 4,653,362 A * | 3/1987 | Gerber | B26D 7/08 | 219/221 |
| 4,688,502 A * | 8/1987 | Krieger | A47G 9/0207 | 112/439 |
| 4,722,608 A * | 2/1988 | Salzman | B01F 7/00016 | 366/270 |
| 4,912,302 A * | 3/1990 | Kobayashi | F27B 5/14 | 219/390 |
| 5,061,418 A * | 10/1991 | Ware | B29C 43/32 | 264/257 |
| 5,394,933 A * | 3/1995 | Takayanagi | B22C 1/06 | 164/138 |
| 5,630,260 A * | 5/1997 | Morita | A41H 43/005 | 112/DIG. 2 |
| 5,848,573 A * | 12/1998 | Hirano | D05B 3/06 | 112/294 |
| 5,921,754 A * | 7/1999 | Freitas | B29C 70/345 | 264/103 |
| 6,019,927 A * | 2/2000 | Galliger | B22C 7/02 | 164/35 |
| 6,196,802 B1 * | 3/2001 | Matsumoto | F04D 25/0613 | 415/216.1 |
| 6,264,430 B1 | 7/2001 | Hulkkonen et al. | | |
| 6,286,162 B1 * | 9/2001 | Huart | A47G 9/0261 | 5/482 |
| 6,305,458 B1 * | 10/2001 | Gligor | B22C 9/046 | 164/28 |
| 6,340,288 B1 | 1/2002 | Hulkkonen et al. | | |
| 6,402,467 B1 * | 6/2002 | Godichon | F04D 29/281 | 415/200 |
| 6,470,815 B1 * | 10/2002 | Ho | D05B 3/02 | 112/260 |
| 6,663,347 B2 * | 12/2003 | Decker | B22C 7/02 | 164/45 |
| 6,838,120 B2 * | 1/2005 | Kim | C04B 41/5059 | 264/29.7 |
| 6,854,960 B2 * | 2/2005 | Van Dine | F04D 29/326 | 156/242 |
| 6,899,728 B1 * | 5/2005 | Phillips | A61F 2/07 | 600/36 |
| 6,936,341 B2 * | 8/2005 | Huner | C04B 35/565 | 260/998.13 |
| 7,008,338 B2 * | 3/2006 | Pearson | A63B 59/70 | 473/560 |
| 7,491,032 B1 * | 2/2009 | Powell | F04D 29/023 | 29/889.71 |
| 7,938,627 B2 * | 5/2011 | Muller | F01D 5/34 | 29/889.2 |
| 8,092,187 B2 * | 1/2012 | Bell | F03D 1/06 | 29/889.7 |
| 8,268,438 B2 * | 9/2012 | Friess | F02K 9/90 | 415/200 |
| 8,387,504 B2 * | 3/2013 | Cairo | B22D 19/14 | 87/1 |
| 8,905,719 B2 * | 12/2014 | Kray | F01D 9/042 | 416/230 |
| 2002/0038923 A1 | 4/2002 | Lenherr | | |
| 2003/0235502 A1 * | 12/2003 | Van Dine | F04D 29/326 | 416/230 |
| 2004/0013546 A1 | 1/2004 | Klein et al. | | |
| 2004/0241000 A1 | 12/2004 | Godichon et al. | | |
| 2006/0008611 A1 * | 1/2006 | Shen | B32B 3/12 | 428/73 |
| 2006/0142100 A1 * | 6/2006 | Pearson | A63B 59/70 | 473/560 |
| 2006/0165530 A1 * | 7/2006 | Corbin | F01D 5/3007 | 416/220 R |
| 2007/0184244 A1 * | 8/2007 | Dohring | B44C 5/0476 | 428/143 |
| 2008/0286130 A1 | 11/2008 | Purvines | | |
| 2009/0064911 A1 * | 3/2009 | Oxley | D05B 11/00 | 112/2.1 |
| 2009/0142196 A1 | 6/2009 | Gerhardt et al. | | |
| 2010/0223906 A1 * | 9/2010 | Friess | F02K 9/90 | 60/230 |
| 2010/0248573 A1 * | 9/2010 | Hascalovich | B29C 44/1209 | 442/205 |
| 2011/0192531 A1 * | 8/2011 | Sekido | B29C 33/0066 | 156/245 |
| 2011/0297325 A1 * | 12/2011 | Maheshwari | B29C 70/545 | 156/500 |

FOREIGN PATENT DOCUMENTS

| | | |
|---|---|---|
| EP | 1 704 990 A1 | 9/2006 |
| EP | 1 798 418 A2 | 6/2007 |
| EP | 2 105 579 A2 | 9/2009 |
| FI | 101564 B1 | 7/1998 |
| JP | 3-156195 A | 7/1991 |
| JP | 09-217601 A | 8/1997 |
| WO | WO 98/08370 A2 | 3/1998 |

* cited by examiner

VANE LEADING EDGE FREE FROM BREAKING FIBERS

FIG.4a

FIBER BAND  B

WINGS OF VANE PERFORMS INTERLACED AT END DISKS, D

STITCHES

METHOD FOR MANUFACTURING THE IMPELLER OF A CENTRIFUGAL COMPRESSOR

CROSS-REFERENCE TO RELATED APPLICATION

The present application claims priority under 35 U.S.C. §119 to Finnish Patent Application No. 2010-284060, filed Jan. 21, 2010, the entire contents of which are hereby incorporated by reference.

BACKGROUND OF THE INVENTION

1. Field of the Invention

The invention relates to a method for manufacturing the impeller that is capable of being mounted on a shaft of an electric motor of a radial compressor or radial blower, and the use of the same.

2. Description of the Background Art

Figure 1:
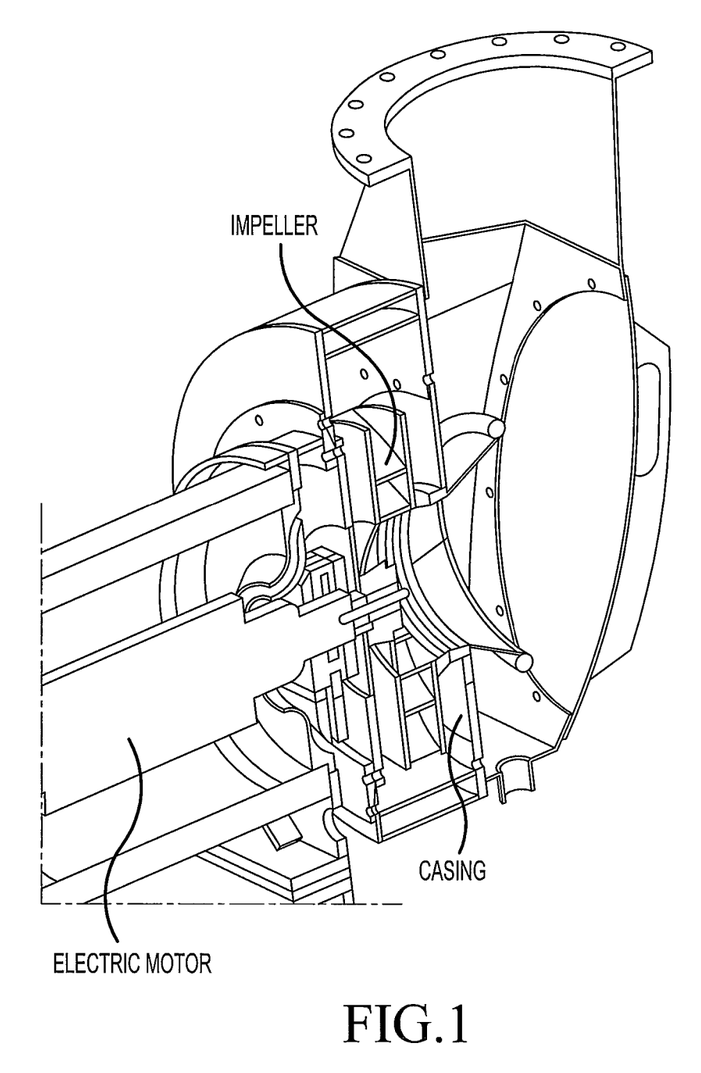
FIG. 1 shows a typical compressor or blower construction.

In the prior art, a great number of different types of compressors and blowers are known being used in various applications. Particularly in industrial applications, pumping of gases is accomplished with the help of centrifugal compressors, also known as radial compressors, and radial blowers. Typically this kind of blower construction comprises a rotary impeller, such as shown in FIG. 1, serving to accelerate the gas flow by centrifugal force, and a spiral-shaped flow-guiding envelope construction called the casing. Both the impeller and the casing are typically made from sheet steel or other sheet metal. Also conventionally, the sheet metal construction is comprised of two-dimensional (2D) elements.

Figure 2:
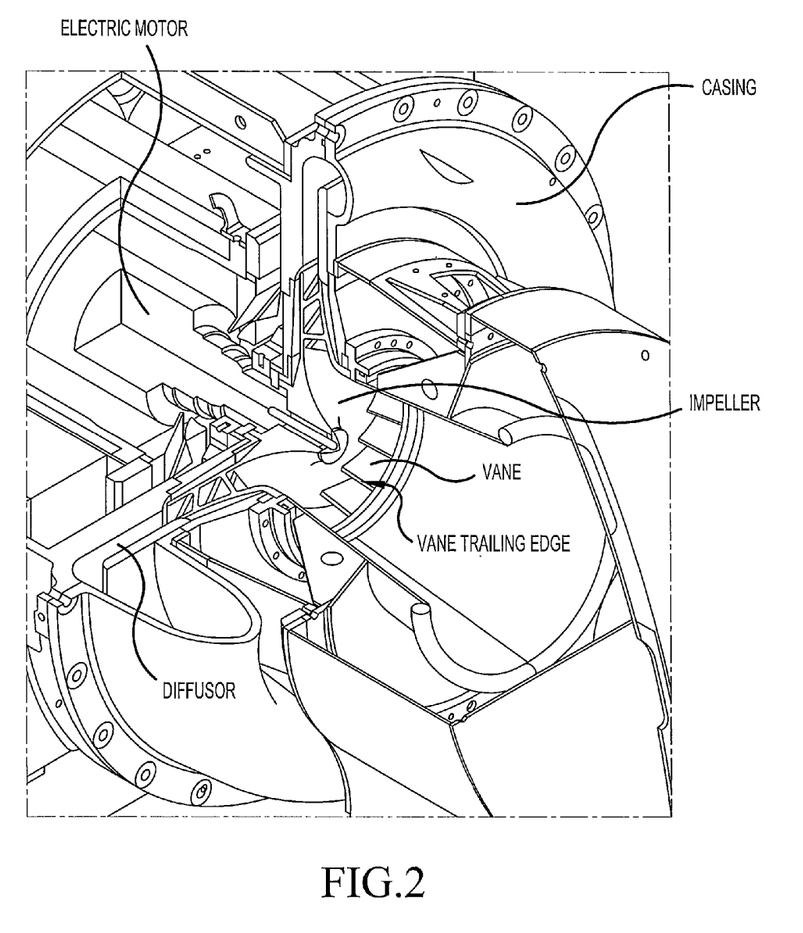
FIG. 2 shows a sectional view of a compressor mounted on the shaft of an electric motor.

In order to reach higher pressures or elevated pumping efficiency, the flow dynamics of the impeller and casing must be improved. To this end, both the impeller and the casing must have a three-dimensional (3D) geometry. As the fabrication of such a construction from sheet elements is impractical, casting is typically employed as the manufacturing method. Besides the choice of the different manufacturing method, a blower construction is complemented with a duct known as the diffuser that is adapted between the impeller and the spiral casing to convert dynamic pressure into static pressure. This kind of construction is generally called a compressor. Annexed FIG. 2 shows a sectional view of a compressor mounted on the shaft of an electric motor.

The above-described approach to reach higher outlet pressure generally requires that the impeller is driven faster than the maximum rotational speed provided by an electric motor. Conventionally, the elevation of impeller rotational speed has been implemented with the help of a step-up gear or V-belt drive. The impeller drive shaft is designed such that the first critical speed of the shaft is situated below the actual rotational speed. This arrangement allows the use of a relatively thin shaft and a heavy impeller. However, the rotational speed of such a compressor is not adjustable inasmuch as the control range would extend to the critical speed that could cause damage to the machinery.

A recent technology in stepping up rotational speed is the use of a frequency converter. Thereby the blower or compressor can be variable-speed controlled. Such a solution allows the impeller to be mounted directly on the shaft of the electric motor without the need for a step-up gear. However, direct mounting on the motor shaft poses certain technical constraints. The construction of the impeller and its drive shaft must be designed such that the first critical speed is situated higher than the maximum drive speed, whereby a relatively thick shaft is required. Yet, there is a limit to the use of a thick shaft, because the diameter of bearings also increases. The maximum operating rpm of a bearing is inversely proportional to the bearing diameter, which means that a smaller diameter allows a higher operating rpm. Another factor affecting the critical speed is the mass of the impeller. The lighter the impeller, the higher the critical speed of the shaft-impeller construction. Due to the above reasons, impellers intended to be mounted directly on a motor shaft are generally made of light-metal alloy or a composite material.

A typical material choice for heavy-duty composite structures is a so-called prepreg material generally comprising woven carbon fiber preimpregnated with epoxy resin. This material is stored in a sheet inventory as the curing of the resin needs an elevated temperature. During manufacture, the impregnated sheet is first heated to room temperature and laminated in a mold. The mold is placed in a vacuum bag, and curing takes place in an autoclave. This process is employed to manufacture components used in the most demanding aircraft structures, for instance. Components manufactured from prepreg materials are quite expensive due to the great number of work hours and costly raw materials. Furthermore, the strength of a composite structure is dependent on the fiber content in the structure. Typically, components made from prepreg materials can reach a fiber content of 60%, whereby the structure is principally comprised of carbon fiber.

Another manufacturing method used in the art is the RTM process (Resin Transfer Molding). In the RTM process, the fiber cloths used as reinforcement are placed in dry form into the mold. The mold is closed, and the resin is injected under pressure into the mold. This method is quicker than the prepreg process, and readily allows the construction to be made from fiber cheaper than carbon fiber. Conversely, the fiber content is typically only 40%, inasmuch as the product structure is basically comprised of the resin.

As described above, RTM is a manufacturing method using a closed mold. More specifically, the resin is injected into a space defined by mold walls, whereby the method is based on the infusion of liquid resin into the dry reinforcing fabric under imposed pressure. The applications of the RTM method include structural elements having a complicated geometry and typically operating under high stress. As reinforcing materials the RTM method can use almost all dry fabrics and cloths, carbon fiber reinforcements inclusive. The matrix materials can respectively be 1- or 2-component epoxy, vinyl or polyester resins. The process uses closed molds, and the reinforcements are generally preformed prior to the infusion step. The benefits of the method are a high degree of construction integration, high quality of tolerances and surface structure, particularly combined with possibility of utilizing a high degree of automation.

In the prior art, some arrangements for manufacturing composite impellers are known; however, implemented using a prepreg process. One embodiment of a composite impeller, which is directly mounted on the electric motor shaft, is described in patent publication FI 101564 (Hulkkonen et al.). Therein the impeller is made of a composite material substantially comprised of carbon fiber. The manufacturing method is based on a prepreg process. Manufacture of impellers by way of this approach is highly labor intensive, because the preparation of a thick laminate structure requires plural intermediate vacuum pumping cycles. In the manufacture, this means that after a given thickness of lamination has been attained, the structure must be inserted in a vacuum bag with the help of which the layers are compressed firmly against each other. Another worktime-increasing factor arises from the machining of the cured impeller blank to final dimensions. Machining is labor-intensive and cuts fibers. Particularly problematic are severed fibers at the leading edge of the impeller vane that meets the gas flowing at a high velocity, whereby it must be noted that the flow frequently carries along a certain amount of particulates.

Another prepreg manufacturing process is based on embedding an aluminum honeycomb structure or foamed core material in thick constructions. This approach generally used by aircraft manufacturers. For the manufacture of a blower impeller, this method is described in patent publication U.S. Pat. No. 6,402,467 (Godichon et al.). According to this publication, the cored inlet/rear disks and the vanes of the impeller are manufactured separately. After the completion of these components, the necessary machining steps are carried out. The components have guiding surfaces to facilitate the bonding of the components together. Vacuum bonding is employed to finish the impeller. Generally, a compressive tool is required to secure a homogeneous bonding pressure. However, the weakest point in a structure assembled from separate elements is always the bonded seam. To bond seams capable of enduring high stresses in volume series with a consistent quality necessitates the use of expensive equipment and, generally, a post-production qualification step based on some nondestructive test method.

Both prior-art manufacturing methods described above are highly labor-intensive. Moreover, certain other problems have occurred in practical applications. In comparison with metallic impellers, all carbon-fiber composite structures are generally hampered by inferior endurance under erosive conditions. This is caused by the high velocity of gas impounding against the impeller. Generally all practical applications employing blowers or compressors have a certain amount of particulates flowing along with the gas stream. Solid particulates impinging on the composite structure cause abrasive wear that eventually deteriorates the impeller. A remedy to this problem has been sought from the use of metallic reinforcements at the most critical points of the impeller.

In the prior art, manufacturing methods have been extensions to conventional techniques. In patent publication U.S. Pat. No. 6,402,467 is described an embodiment having a steel guard member placed on the leading edge of the impeller vane. Another similar structure is disclosed in patent publication U.S. Pat. No. 6,264,430 (Hulkkonen et al.), wherein the trailing edge of the vane has respectively been reinforced with a metal shield plate. In practice, the above-described embodiments have been problematic. Particularly due to differences in thermal expansion coefficients, high rotational speed and the like reasons, the shields/guards have separated under use thereby causing serious damage.

It must further be noted that prepreg materials also impose constraints to the product geometry, since the prepreg itself as well as the core material are rather sheet-like thus being incompatible with the lamination 3D structures. Resultingly, prior-art embodiments have been hampered by plural disadvantages that have retarded actual advancements in the development of composite material impellers.

SUMMARY AND OBJECTS OF THE INVENTION

Now, the embodiment according to the present invention achieves improved utilization of the benefits of a composite construction. Accordingly, a blower or compressor may be equipped with a composite impeller mounted directly on the electric motor shaft. The basic concept of the present invention is to utilize a manufacturing method normally employed in different state of the art. This approach allows the implementation of an impeller construction for a blower or compressor without the disadvantages associated with the prior art described above. Moreover, the structure of the composite material impeller and its various applications can be enhanced substantially with simultaneous optimization of the entire machinery functions. More specifically, the invention is characterized by the utilization of the RTM process in the manufacture of an impeller.

It is an object of the present invention to provide an entirely novel approach. The goal of the invention is to develop a method for manufacturing the impeller of a centrifugal, i.e., a radial compressor or radial blower, said impeller being mounted directly on the shaft of an electric motor. According to the method, a composite material impeller is manufactured using an RTM process (Resin Transfer Molding), whereby the core and accurately trimmed fabric layers or sheets are placed in the RTM mold. A characterizing feature of the method is that the fabric layers or sheets, or preforms, are pulled over the core so that the material net usage in the entire structure is maximally optimized. By the definition of the invention, maximally optimized production refers to a product that disposes with any postprocessing after the product is released from the mold. Resultingly, the method offers a substantially shorter work cycle, inasmuch no time is lost in postprocessing.

The embodiment according to the present invention allows the implementation of impeller structures of appreciably more complicated and technically demanding nature than those of the state of the art. Simultaneously, the problems hampering the prior-art techniques are avoided. The characterizing features of the invention contribute essentially to the structure of the impeller and the method of manufacturing the same defined in the appended claim. Hence, the method according to the invention provides plural significant advantages.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 3:
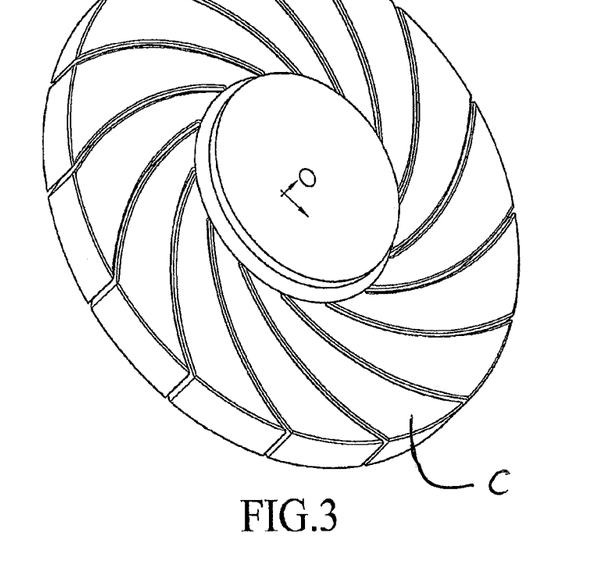
FIG. 3 shows an outline of a core.
Figure 4:
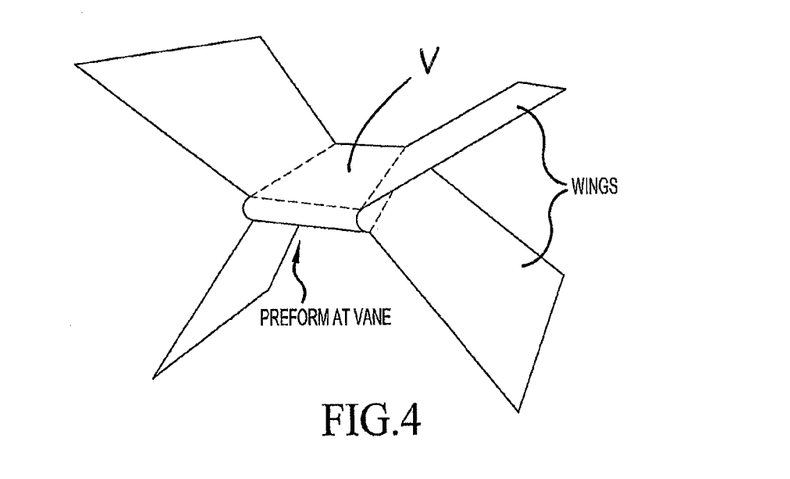
FIGS. 4 and 4a show a trimmed fabric layer folded into shape at a vane.

FIGS. 1 and 2 show the basic components of a typical compressor. As illustrated in FIG. 1, the construction of a compressor or blower comprises an impeller serving to accelerate a gas flow by centrifugal force and a spiral-shaped flow-controlling structure called casing. In the sectional view of FIG. 2, the construction is implemented in a compressor construction mounted directly on the shaft of an electric motor in a basic manner employed in the structure described in the present invention. According to the method of the present invention, as illustrated in FIG. 3, the process comprises preparation of a first breakable/meltable/dissolvable core C as well as a second core deformable by vacuum/pressure of compressed air or liquid, the latter core delineating the flow paths of the impeller. In the art is known a plurality of alternative materials suited for use in the manufacture of hollow-core products. According to the invention, all the fabric layers of the vanes V and disks D of the impeller are produced with the help of dedicated automatic fabric layer cutting machine. While the fabric layers obviously could be trimmed manually, the advantageous features of the process will by particularly advantageous by using an automatic fabric layer cutting machine. The cutting templates are preprogrammed with the help of the 3D model of the impeller, whereupon the fabric layers, or preforms, of the impeller vanes V can be prepared. In FIG. 4 is shown one trimmed fabric layer folded into the shape of an impeller vane V. As illustrated, the wing portions of the preform are bent parallel to disks D of the impeller.

Figure 4A:
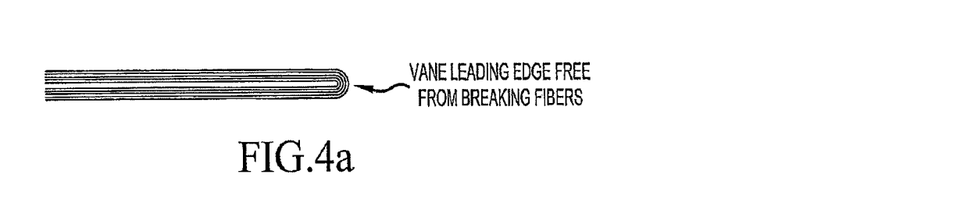

It is worthwhile to note that in the embodiment of invention shown in FIG. 4, the fibers of the fabric layers at the leading edge of the vane V are not broken, but instead, the fibers of the fabric layers are bent smoothly. Thus, the leading edge of the vane V is formed in a consistent fashion particularly at the point, whereon the flowing gas impinges at a high velocity when it meets the impeller. The fibers of the fabric layers are also bent in the same manner at the outer perimeters of the fabric layers to achieve a maximally optimized material net usage. In FIG. 4a the construction is shown in a view sectionally taken along the vane V. The drawing illustrates the manner in which the fabric layers are laid up in the vane V and how the fabric layers bend continuously about the leading edge of the vane V. At the joints between the vanes V, the fabric layers are attached to each other (stitched to each other) with the help of an industrial sewing machine suited for the use of a carbon fiber or titanium wire for stitching. This arrangement increases the impeller strength at the areas of highest stresses and secures the placement of the fabric layers during resin injection. The use a twill weave allows the implementation of 3D shapes. In the twill weave, the fibers can move easier relative to each other than in a plain weave. This property facilitates the manufacture of complicated preform shapes.

Figure 5:
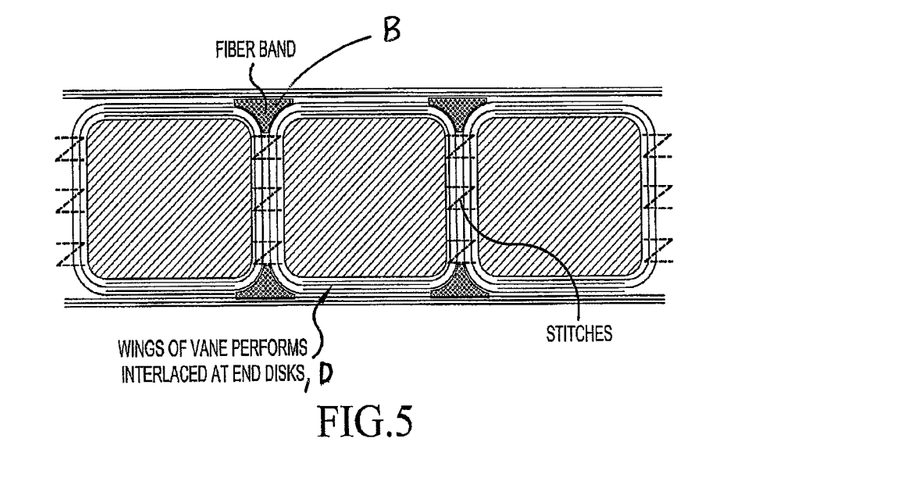
FIG. 5 shows a sectional view at three vanes after the trimmed fabric layers have been placed onto the core.

In the method according to the invention, the vane preforms are pulled over the core C. Next, the weaves are placed over the vanes V and the disks D so as to make them alternatingly interlace with the weaves of the adjacent vane V. As is evident from FIG. 5, this arrangement secures even distribution of stresses over the entire structure. The annexed drawing shows a sectional view over three vanes V after the fabric layers have been placed over the cores. The interstitial spaces between the vanes V form voids that can be filled with, e.g., a band B braided from a thick fiber, or some other advantageous material such as a cloth, filler or the like.

Figure 6:
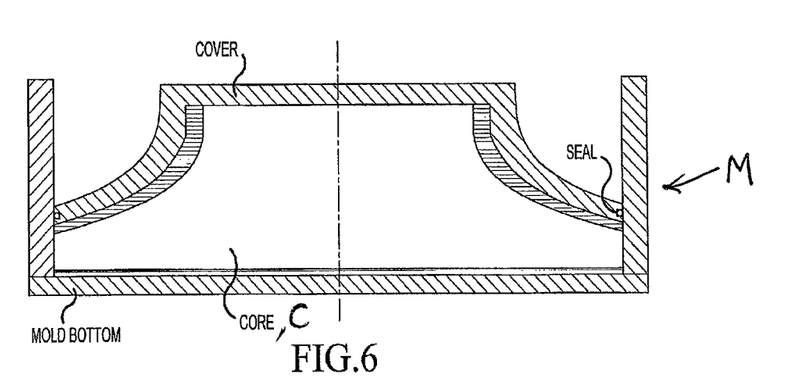
FIG. 6 shows sectional view of the mold and the core.

The core C and fabric layers are placed in the RTM mold. The mold can be designed such that its center has a metal hub on which the core C inserted. As shown in FIG. 6, the mold cover is formed into the shape of the impeller's front-side disk D. The mold cover is provided with O-rings that secure the overall tightness of the mold M. A single mold advantageously serves the manufacture of impellers of various sizes just by changing its cover plate and replacing a core C of a different size. An essential feature of the invention is that the fabric layers are placed in the mold M so as to obtain a maximally optimized net usage of material. Next, the resin is injected into the mold M according to the RTM process (Resin Transfer Molding) discussed above. When the process is completed, the mold M is opened and the core C is removed depending on the manufacturing technique thereof by breaking, melting or dissolving. In FIG. 6 is illustrated the construction of a single-piece core C having no central metal hub in a view sectionally taken through the core C along the vanes V. As the drawing only shows the principle of the method, the openings required for resin injection are omitted.

The above-described exemplary embodiment is, however, nonlimiting to the use of the method according to the invention but rather, it can be applied to the implementation of various constructions of impellers. A noteworthy aspect to be considered herein is that a major portion of the impeller manufacturing costs is caused by the work hours. In practice the work time is grossly divisible into the steps of trimming the fabric layers, inserting the fabric layers into the mold, injecting the resin, opening the mold M, breaking the core C, machining the product to its final shape and mounting the same on the metal hub, complemented with the balancing of the assembly.

The method disclosed in the invention offers significant savings in worktime inasmuch as all trimming is carried out using an automatic cutting machine. The trimming patterns of fabric layers are designed such that a maximally optimized net usage of material in the product is attained. Furthermore, the accurately trimmed fabric layers are adhered to each other by stitches S which step prevents their displacement during resin injection. Resultingly, the need for impeller balancing is minimized.

While the RTM process typically uses less fiber, the reduced strength resulting from the smaller amount of fiber is compensated for by increasing the product thickness at the points of the structure that are subjected to the greatest stresses. The RTM process further permits the use of plural different fiber types and selection thereof as required by different applications. Hence, areas subjected to lesser stress can be implemented using weaker cloths, fillers and metals, while areas subjected to maximal stresses are made using costlier fibers oriented in the direction of stress forces. Partial improvement in structural strength may also be imparted by stitching the fabric layers to each other, e.g., at the vanes V. Additional structural strength is also attained both by virtue of the fiber layout disclosed herein that transmits stresses homogeneously from vanes V to the end disks D as well as by the present manufacturing method that entirely eliminates the need for bonding.

Figure 7:
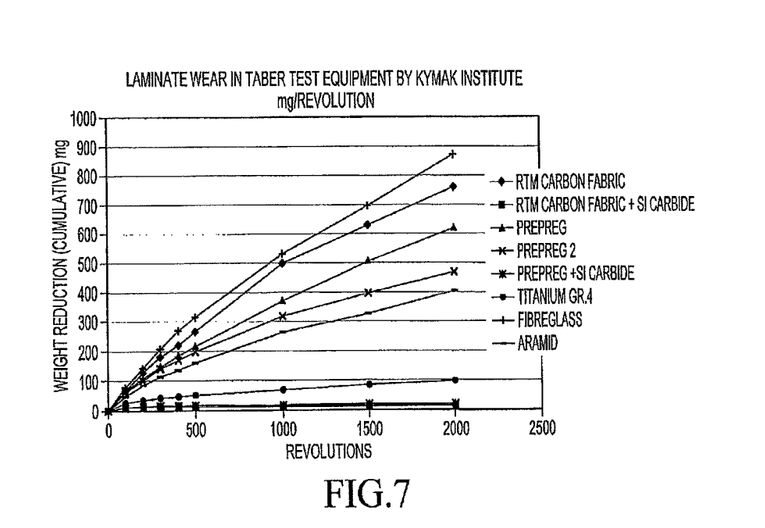
FIG. 7 shows a table representing the abrasion test results of the structure.
Figure 8:
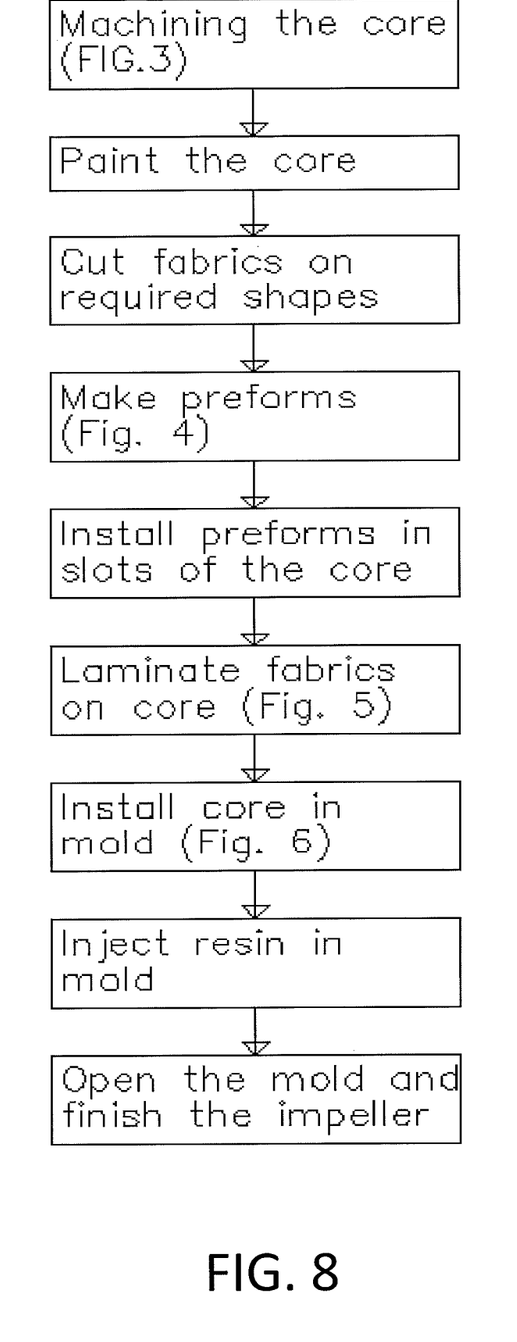
FIG. 8 shows steps in the method for manufacturing impeller of centrifugal compressor.

The method according to the invention also is capable of overcoming the inferior resistance of composite structures to corrosion. In industrial applications it is common to use different kinds of coatings for improved resistance to erosion/corrosion in machine elements. Respectively, also composite impellers have been protected with the help of various materials and methods. In practical applications the coating step is labor-intensive and requires the use of costly materials. Impellers in particular are problematic due to the risk of coat delamination that may cause imbalance of the impeller. This problem is eliminated in the invention by the use of a fine-mesh silicon carbide powder or other similar ceramic or the like abrasion-resistant powder that is brushed into the surface fabric layers of the impeller prior to the resin injection step. Alternatively, the abrasion-resistance-improving powder may be added directly to the resin or accelerator thereof being injected. Additional improvement to abrasion resistance can be achieved by making a separate wear layer from a fabric layer pretreated with such a powder. This arrangement results in a surface of high resistance to abrasion in the finished composite structure. Table 7 shows the test results obtained by an independent research institution when the novel material is compared to an untreated carbon fiber surface and a titanium metal sheet using Taber® abrasion test equipment. The test was carried out to compare the abrasion resistance of conventional carbon fiber surfaces and titanium sheet to the performance of the structure implemented in accordance with the present invention. As is evident from the table, the best performer was a test sheet manufactured from dry fabric layers impregnated with silicon carbide powder. The test results prove the extremely high abrasion resistance of the arrangement used in the invention.

To a person skilled in the art it is obvious that the invention is not limited by the above-described exemplary embodiments, but rather may be varied within the inventive spirit and scope of the appended claims.

What is claimed is:

1. A method for manufacturing an impeller that is capable of being mounted on a shaft of an electric motor of a centrifugal radial compressor or a radial blower, wherein the impeller is made of a composite material using a Resin Transfer Molding (RTM) process, including the steps of:
    preparing a breakable, meltable, dissolvable, or shapable single-piece core,
    placing accurately trimmed fabric layers in the single-piece core of a mold for the RTM process in a manner to enable pulling of the fabric layers or preforms onto the single-piece core, thus achieving a maximally optimized use of materials in a structure of the impeller,
    the method further comprising:
    using fibers of different types so that areas of the structure of the impeller subjected to lesser stress are implemented using the fibers of a cloth, or fillers, or metals that are weaker than the fibers in the accurately trimmed fabric layers,
    orienting the fibers in the fabric layers in a direction of stressing forces in maximally stressed areas, whereby the fibers of the fabric layers at a leading edge of the fabric layers are bent smoothly around the leading edge, wherein a lower fiber content and lesser strength associated with the RTM method are compensated for by increasing a thickness at points of the structure of the impeller that are subjected to greatest stresses, and further comprising:
    laying out the fabric layers of the impeller prior to a step of injecting resin, and
    improving abrasion resistance by way of making a separate wear layer from one of the fabric layers pretreated with an abrasion-resistance-improving powder,
    inserting the single-piece core into the mold, the single-piece core being breakable, meltable, dissolvable, or shapable by means of compressed air or liquid,
    forming flow spaces of the impeller with the single-piece core, and
    shaping a front-side disk of the impeller with a cover of the mold which is shaped advantageously for shaping the front-side disk of the impeller,
    wherein the cover of the mold is provided with an O-ring that secures tightness of the cover to an inner circumference of the mold.

2. The method of claim 1, further comprising:
    trimming the fabric layers with an automatic fabric cutting machine, and
    placing each of the fabric layers in place so that they are alternatingly interlaced with an adjacent one of the fabric layers.

3. The method of claim 1, further comprising:
    trimming of the fabric layers using an automatic fabric cutting machine, and
    joining exactly identical ones of the fabric layers with each other by stitching to avoid mutual displacement during a step of injecting resin,
    thus achieving the maximally optimized use of the materials in the structure of the impeller.

4. The method of claim 1, further comprising:
    filling voids between vanes of the impeller by a band braided from a thick one of the fibers, or by using the cloth, or the fillers.

5. The method of claim 1, further comprising:
    placing weaves over vanes and disks of the impeller so as to make them alternatingly interlace with the weaves of adjacent ones of the vanes, and
    interlacing the fabric layers in each of the vanes of the impeller,
    wherein each of the fabric layers is continuous at a leading edge of each of the vanes by way of having the fabric layers attached to each other using an industrial sewing machine with a titanium wire as thread.

6. The method of claim 1, further comprising:
    manufacturing the centrifugal radial compressor and the radial blower.

7. The method of claim 6, further comprising:
    manufacturing the composite material impeller mounted on the electric motor shaft using the RTM process, by trimming the fabric layers and pulling the fabric layers or the preforms onto the single-piece core, so as to maximally optimize the use of the materials in the structure of the impeller.

8. The method of claim 1, wherein the fabric layers in joints between parallel sides of the preforms are stitched to each other with an industrial sewing machine.

9. The method of claim 1, further comprising:
    wing portions of the fabric layers or the preforms are bent parallel to the front-side disk of the impeller.

10. The method of claim 2, further comprising:
    placing weaves over vanes and disks of the impeller so as to make them alternatingly interlace with the weaves of adjacent ones of the vanes, and
    interlacing the fabric layers in each of the vanes of the impeller,
    wherein each of the fabric layers is continuous at a leading edge of each of the vanes by way of having the fabric layers attached to each other using an industrial sewing machine with a carbon fiber or titanium wire as thread.

11. The method of claim 1, wherein the fabric layers in joints between parallel sides of the preforms are stitched to each other with an industrial sewing machine.

12. A method for manufacturing an impeller that is capable of being mounted on a shaft of an electric motor of a centrifugal radial compressor or a radial blower, wherein the impeller is made of composite material using a Resin Transfer Molding (RTM) process, including the steps of:
preparing breakable, meltable, dissolvable, or shapable single-piece core,
placing accurately trimmed fabric layers in the single-piece core of a mold for the RTM process in such a manner to enable pulling the fabric layers or preforms onto the single-piece core, thus achieving a maximally optimized use of materials in a structure of the impeller,
orienting fibers in the fabric layers in a direction of stressing forces in high stressed areas, whereby the fibers of the fabric layers at outer perimeters of the fabric layers are bent smoothly around the outer perimeters of the fabric layers, and
interlacing the fabric layers in each of the impeller vanes, wherein each of the fabric layers is continuous at a leading edge of each of the vanes by way of having the fabric layers attached to each other using an industrial sewing machine with a titanium wire as thread, and
further comprising:
laying out the fabric layers of the impeller prior to a step of injecting resin, and improving abrasion resistance by way of making a separate wear layer from one of the fabric layers pretreated with an abrasion-resistance-improving powder,
inserting the single-piece core into the mold, the single-piece core being breakable, meltable, dissolvable, or shapable by means of compressed air or liquid,
forming flow spaces of the impeller with the single-piece core, and
shaping a front-side disk of the impeller with a cover of the mold which is shaped advantageously for shaping the front-side disk of the impeller,
wherein the cover of the mold is provided with an O-ring that secures tightness of the cover to an inner circumference of the mold.

13. The method of claim 12, further comprising:
filling voids between vanes of the impeller by a band braided from a thick one of the fibers, or by using cloth, or fillers.

\* \* \* \* \*